H. L. POWELL.
APPARATUS FOR FORMING CAKES, &c.
APPLICATION FILED NOV. 28, 1919.
1,399,873.
Patented Dec. 13, 1921.
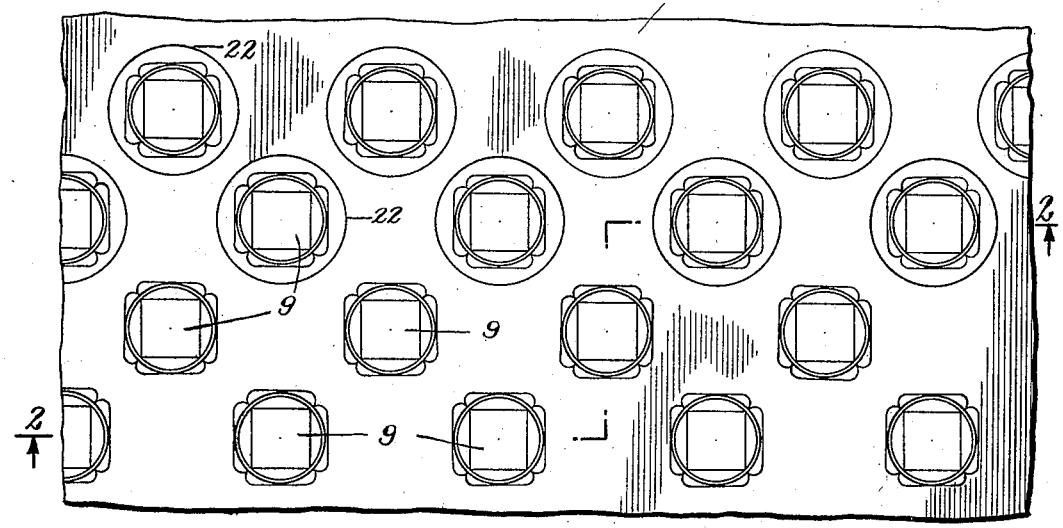
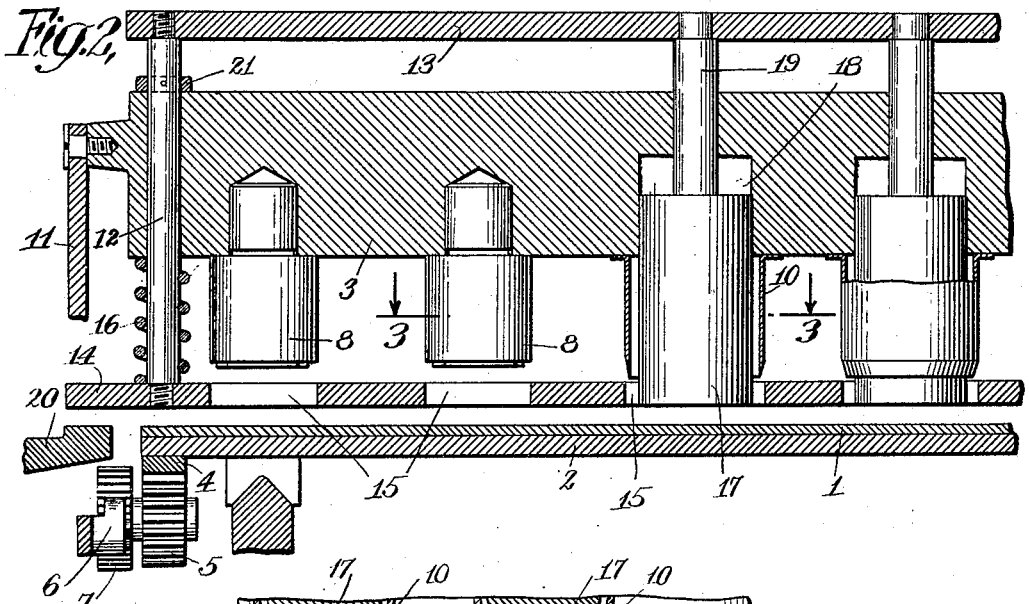
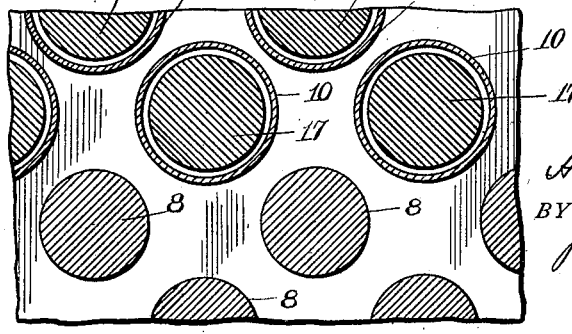
INVENTOR.
Howard L. Powell
BY
ATTORNEY.

UNITED STATES PATENT OFFICE.

HOWARD L. POWELL, OF NEW YORK, N. Y., ASSIGNOR TO NATIONAL BISCUIT COMPANY, OF NEW YORK, N. Y., A CORPORATION OF NEW JERSEY.

APPARATUS FOR FORMING CAKES, &c.

1,399,873.     Specification of Letters Patent.     Patented Dec. 13, 1921.

Application filed November 28, 1919. Serial No. 341,014.

*To all whom it may concern:*

Be it known that I, HOWARD L. POWELL, a citizen of the United States, residing in the borough of Manhattan, city, county, and State of New York, have invented certain new and useful Improvements in Apparatus for Forming Cakes, &c., of which the following is a specification.

My invention relates to apparatus for stamping or embossing designs on a sheet of dough and cutting around the designs to form cakes or the like, which are subsequently to be baked, and each of which carries one of the designs formed thereon. In the present practice a sheet of dough is progressed intermittently on a suitable support below a platen which carries a row of cutting knives adapted to cut in the dough the outlines of cakes having a desired configuration. Within each of the inclosing cutters is mounted a die or stamp for embossing a design upon the cake, the outline of the cake being thus cut and the design formed simultaneously. With this construction it is necessary to have a stripping member, known as a "clearer", mounted within the peripheral or inclosing cutter and outside the design stamp, this stripping member acting to hold down the dough, to prevent the same from sticking to the cutter and the stamp, and rising with the same when the platen rises.

Various difficulties arise in connection with this previously known construction. The necessity of interposing the clearer between each peripheral cutter and its design stamp makes it impossible to have the design cover any large area of the cake. It is also impossible with this construction to form any but the simplest designs with a desirable clear outline, because the necessary pressure of an embossing stamp carrying a complicated design would compress the dough within the encircling cutter to such an extent as to set up stresses in the dough and to cause "checking" when the cakes are subsequently baked so that the same are apt to be broken. With this previously used construction such stressing of the dough and consequent checking is apt to occur regardless of the complexity of the design embossed upon the cake, the danger increasing in accordance with the pressure exerted by the stamp as more complicated designs are attempted.

My invention overcomes these difficulties by first stamping the designs upon the sheet of dough and thereafter cutting the outlines of the cakes about the designs. With this method and construction the danger of setting up undue stresses and consequently causing checking is done away with because the dough is not confined within encircling cutters when it is embossed, and consequently whatever stresses are set up by the pressure of the design stamps are taken up by the whole body of the dough. For this reason, designs of quite a complicated character may be formed on the cakes and these may cover substantially the whole surfaces of the cakes, for the reason that no clearers or strippers need be used to surround the design stamps, the "clear plate" through openings in which the design stamps pass acting as a stripper to prevent the dough from sticking to the stamps and rising therewith. With this construction it is only necessary to provide strippers inside the cutters. In my preferred form of apparatus the design stamps extend in a staggered row across the sheet of dough and the cutters extend in a staggered row beyond the design stamps, the forward feed of the dough being so timed that the cutters on one downward movement of the platen will cut around the designs which were embossed on the dough at the preceding downward movement of the platen.

In order that a clearer understanding of my invention may be had, attention is hereby directed to the accompanying drawings forming part of this application illustrating one form of apparatus by which the invention may be practised. In the drawings Figure 1 represents a top plan view of a sheet of dough mounted on a suitable support in the apparatus showing the relation of the dies stamped thereon and the cakes which have been cut; Fig. 2 is a vertical section taken on line 2—2 of Fig. 1; and Fig. 3 is a horizontal section taken through the apparatus, in alinement with the line 3—3 of Fig. 2, the drawings being somewhat diagrammatic.

Referring to the drawings a sheet of dough 1 is represented as being carried by a traveling carrier or support 2, which is adapted to be moved forwardly intermittently below the platen 3. The mechanisms for giving the carrier 2 its intermittent feed and for moving the platen up and down are not material to my invention and are merely illustrated diagrammatically. The carrier 2 is represented as being provided with one or more racks 4 which are moved horizontally by means of gear or gears 5, which are rotated intermittently by pawl 6 and ratchet 7.

The platen 3 is provided with a plurality of embossing stamps 8, 8, which are adapted to form any desired designs, such as those indicated at 9 on the sheet of dough. The peripheral or inclosing cutters 10 are also carried by the platen 3, the stamps 8 and cutters 10 being secured to the platen in any desired manner. The stamps 8 preferably are mounted to extend across the sheet of dough in a staggered row and the cutters 10 in a similar staggered row. A lever 11 is represented as connected to the platen 3 to indicate the means by which the platen is reciprocated.

In the preferred form of my apparatus, rods 12 extend through the platen and have what is known as the back plate 13 secured to their upper ends. Their lower ends carry what is known as the clear plate 14 which is provided with openings 15 through which the stamps 8 and cutters 10 are adapted to pass. The platen is normally held in raised position by spiral springs, such as 16, which are interposed between the platen and the clear plate and may encircle rods 12.

A clearer or stripper 17 is mounted within each of the cutters 10. These clearers may be slidably mounted within suitable recesses, such as is indicated at 18 within the platen 3, and supported from the back plate 13 by means of rods or bolts 19 which extend slidably through suitable openings in the platen 3 and are secured to the back plate 13. Suitable stops, such as 20, are provided below the clear plate 14 to limit the downward movement of the same, and rods 12 are provided with collars 21 secured thereto above the platen 3 to press against the upper surface of the platen in the raised position of the latter.

With the mechanism described the forward feed of the dough sheet is started and the platen descends during each period of rest of the carrier 2 and the dough sheet carried thereby. At the first operation of the platen designs 9 will be embossed on the dough sheet adjacent to the forward edge of the dough sheet, the stamps 8 descending with the platen and moving downwardly through openings 15 in the clear plate to emboss the dough sheet. The clear plate 14 is moved downwardly at the same time by the compression of springs 16, this downward movement being stopped by engagement of lugs 20 so that the clear plate will rest in contact with the upper surface of the dough or immediately above the same, while stamps 8 are operating. The platen will then rise and carry stamps 8 away from the dough, clear plate 14 preventing the dough from sticking to and rising with stamps 8, plate 14 rising somewhat after the stamps 8 have risen, when the compression of spring 16 become too slight to hold the clear plate down any longer.

At the next downward movement of the platen the designs 9, which were formed at the previous operation, will have come to rest in axial alinement with the cutters 10, so that the cutters will cut the outlines of the cakes as is shown at 22 around the designs 9. At the same time the stamps 8 are embossing the next row of designs on the dough sheet, which will be positioned in line with cutters 10 at the next operation. The stripping members 17 inside cutters 10 descend with the clear plate 14 and the back plate 13 at each operation and serve to prevent the cut-out portions of the dough from rising with the knives after the cutting out operation. It will be obvious that the platen and connected parts are supported and guided in their movement in any desired manner, such mechanism being old, for which reason I have not illustrated the same.

What I claim is:—

1. In apparatus for forming cakes and the like, the combination of a support for a sheet of dough, a platen, a group of design stamps and a group of peripheral cutters, carried by said platen, said groups being spaced apart, a clear plate below said platen, having openings therein through which said stamps and cutters pass, means for causing said platen to descend and rise periodically, to cause said stamps and cutters to operate, and means to cause said clear plate to descend to a position just above the dough and to rise after said stamps, and means for causing horizontal movement of said support, between operations of said platen, to so position the sheet of dough as to cause said cutters to cut around the designs previously stamped, to separate the dough into cakes each bearing a design.

2. In apparatus for forming cakes and the like, the combination of a support for a sheet of dough, a platen, a group of design stamps and a group of peripheral cutters, carried by said platen, said groups being spaced apart, a clear plate below said platen, having openings therein through which said stamps and cutters pass, a back plate above the platen, rigid means securing the clear plate and back plate together, strippers mounted inside said cutters, and secured to said back plate, spring means between said platen and clear plate, means limiting movement of said clear plate, and means for causing horizontal movement of said support, between operations of said platen, to so position the sheet of dough as to cause said cutters to cut around the designs previously stamped, to separate the dough into cakes each bearing a design.

3. In apparatus for forming cakes and the like, the combination of a platen, a plurality of design stamps carried thereby, in a staggered row, and a plurality of peripheral cutters carried by said platen in a staggered row, parallel to and spaced apart from said stamps, a clear plate below said platen, having openings through which said stamps and cutters are adapted to pass, a back plate above the platen, means for rigidly securing the back plate and clear plate together, strippers mounted inside said cutters, secured to said back plate and movable relatively to said platen, and spring means between said platen and clear plate.

This specification signed and witnessed this 24th day of November, 1919.

HOWARD L. POWELL.

Witnesses:
G. M. SUNDHEIM,
H. E. WIGGIN.